(12) United States Patent
Berto et al.

(10) Patent No.: US 6,414,785 B1
(45) Date of Patent: Jul. 2, 2002

(54) PRECISION POSITIONER FOR OPTICAL ELEMENTS

(75) Inventors: Thomas E Berto, Santa Rosa; Scott A Robertson, Sebastopol, both of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 90 days.

(21) Appl. No.: 09/714,744

(22) Filed: Nov. 16, 2000

(51) Int. Cl.[7] .................................................. G02B 7/00
(52) U.S. Cl. ........................ 359/333; 359/503; 359/813
(58) Field of Search .................................. 359/503, 813, 359/823, 825, 333; 385/52

(56) References Cited

U.S. PATENT DOCUMENTS

| | | | |
|---|---|---|---|
| 4,767,188 A | 8/1988 | Myer | 350/320 |
| 5,301,566 A | 4/1994 | Tahmasebi et al. | 74/479 B |
| 6,144,506 A | * 11/2000 | Holdener et al. | 359/812 |
| 6,266,196 B1 | * 7/2001 | Do et al. | 359/819 |
| 6,320,707 B1 | * 11/2001 | Khoshnevisan et al. | 359/824 |

OTHER PUBLICATIONS

J. Douglas Knight and Joseph N. West; "A Two–Axis Micropositioner for Optical Fiber Alignment"; Hewlett–Packard Journal, Dec. 1993, pp. 80–84.

Technical Support Package—National Aeronautics and Space Administration; "Mechanism for Planar Manipulation With Simplified Kinematics"; GSC–13655—NASA Tech Briefs; pp. 8–10.

* cited by examiner

Primary Examiner—Mark Hellner
(74) Attorney, Agent, or Firm—John L. Imperato

(57) ABSTRACT

A precision positioner has a moveable stage coupled to an optical element, a frame, a first arm having at a first end a first coupling to the stage, and having a second end adapted to receive a first encoded translator referenced to the frame. The precision positioner also has a second arm having at a first end a second coupling to the stage and having a second end adapted to receive a second encoded translator referenced to the frame. In a first precision positioner, both the first and second couplings to the stage are one-axis rotary flexures. In a second precision positioner, the first coupling to the stage is a one-axis rotary flexure and the second coupling to the stage is a rigid non-flexure.

14 Claims, 3 Drawing Sheets

PRECISION POSITIONER FOR OPTICAL ELEMENTS

BACKGROUND OF THE INVENTION

The performance of optical systems often depends on the precision with which optical elements within the systems can be positioned. For example, to realize performance benefits of single-mode fibers in an optical system, focusing lenses must be positioned with sub-micron precision, within a plane defined by terminal ends of small-diameter optical fibers. There is a need for a precision positioner for optical elements within these systems.

SUMMARY OF THE INVENTION

This need is met by a precision positioner constructed according to the preferred embodiments of the present invention. The precision positioner has a moveable stage, coupled to an optical element, a frame, a first arm having at a first end a first coupling to the stage, and having a second end adapted to receive a first encoded translator that is referenced to the frame. The precision positioner also has a second arm having at a first end a second coupling to the stage and having a second end adapted to receive a second encoded translator that is referenced to the frame. In the precision positioner constructed according to the first preferred embodiment of the present invention, both the first and second couplings to the stage are one-axis rotary flexures. In a precision positioner constructed according to the second preferred embodiment of the present invention, the first coupling to the stage is a one-axis rotary flexure and the second coupling to the stage is a rigid non-flexure.

DETAILED DESCRIPTION OF THE PREFERRED EMBODIMENT

Figure 1:
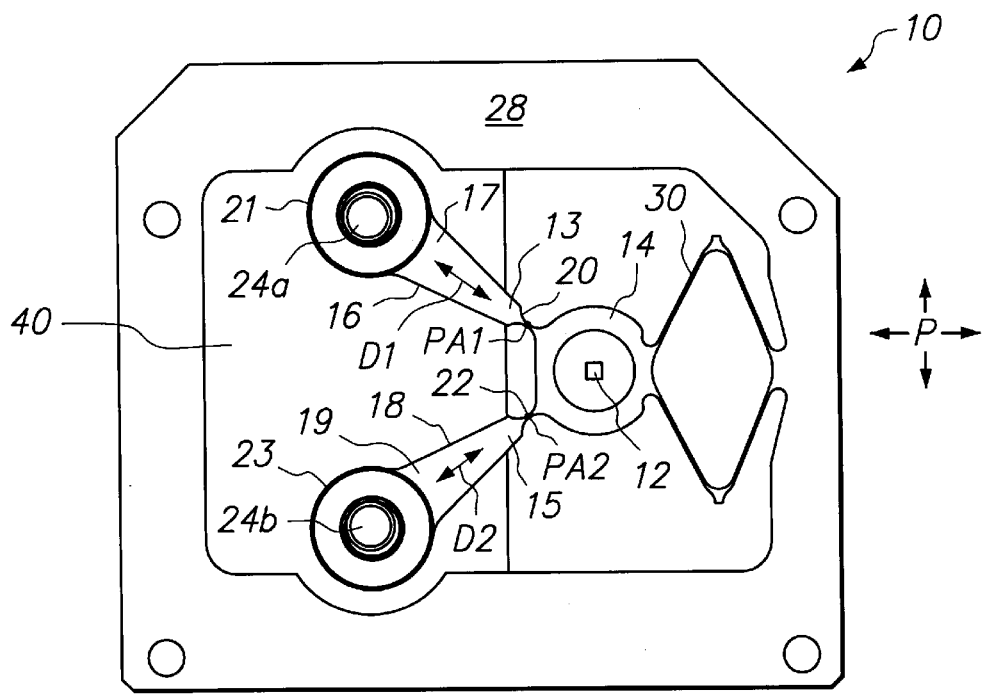
FIG. 1 shows a precision positioner constructed according to a first preferred embodiment of the present invention.
Figure 2:
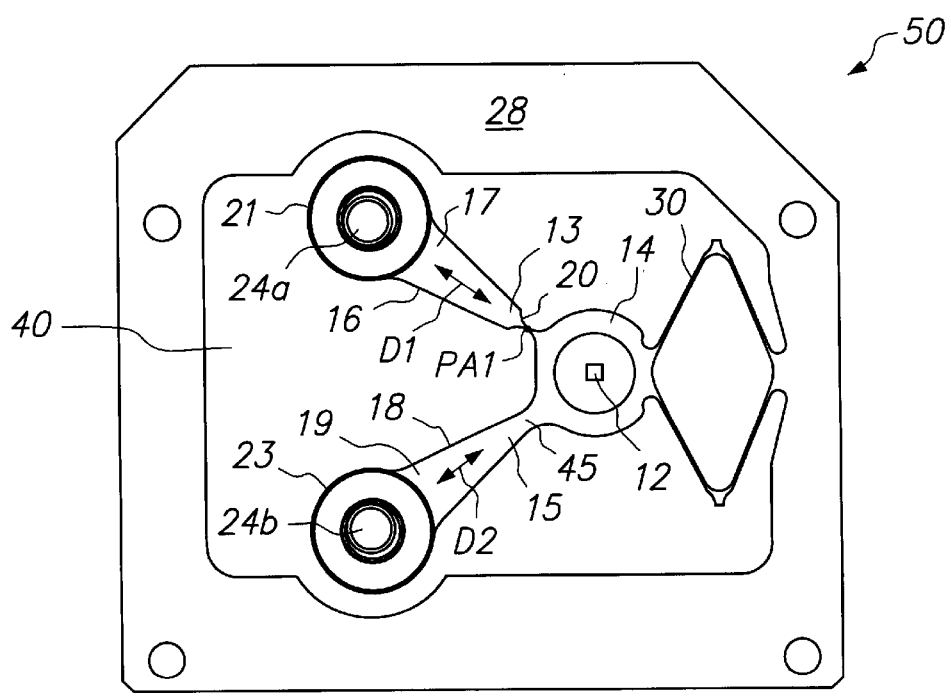
FIG. 2 shows a precision positioner constructed according to a second preferred embodiment of the present invention.

FIG. 1 shows a precision positioner 10 for an optical element 12, constructed according to a first preferred embodiment of the present invention. The optical element 12 is coupled to a moveable stage 14 and includes any type of device or system capable of being coupled to the stage 14. Proximal ends 13, 15 of a first arm 16 and a second arm 18, respectively, are each coupled to the stage 14, each through a one-axis rotary flexure 20, 22. In a precision positioner 50 constructed according to a second preferred embodiment of the present invention, one of the arm 16 and the arm 18 has a rigid non-flexure 45 linking the one of the arms 16, 18 to the stage 14 as shown in FIG. 2. In the precision positioner 10 of FIG. 1 and the precision positioner 50 of FIG. 2, distal ends 17, 19 of each of the arms 16, 18 are each adapted to receive an encoded translator 24a, 24b, reference to a frame 28. The encoded translator 24a articulates the arm 16 along a drive axis D1. The encoded translator 24b articulates the arm 18 along a drive axis D2. Each of the drive axes D1, D2 has a drive component that is parallel to a plane P. In this example, the drive axis D1 and the drive axis D2 are each parallel to the plane P. The arms 16, 18 are also oriented so that the drive axis D1, has a drive component that is orthogonal to drive axis D2.

Motion, or translation, of the moveable stage 14 caused by the articulation of the arms 16, 18 is confined to be parallel to the plane P. In this illustration, a two-dimension flexure 30 interposed between the moveable stage 14 and the frame 28 confines motion of the stage 14 to be parallel to the plane P. Alternatively, the motion of the stage 14 is confined to be parallel to the plane P by engaging the stage 14 within a track, groove, slot or other type of guide. While the planar motion of the stage 14 is enabled by the precision positioners 10, 50, the precision positioners 10, 50 are readily integrated into positioning systems for articulating the optical element 12 along axes that are perpendicular to the plane P.

Figure 3A:
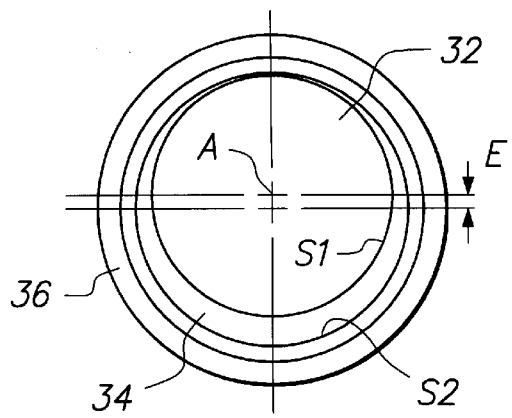
FIGS. 3A–3E are detailed views of the precision positioner of FIG. 1 and FIG. 2.
Figure 3B:
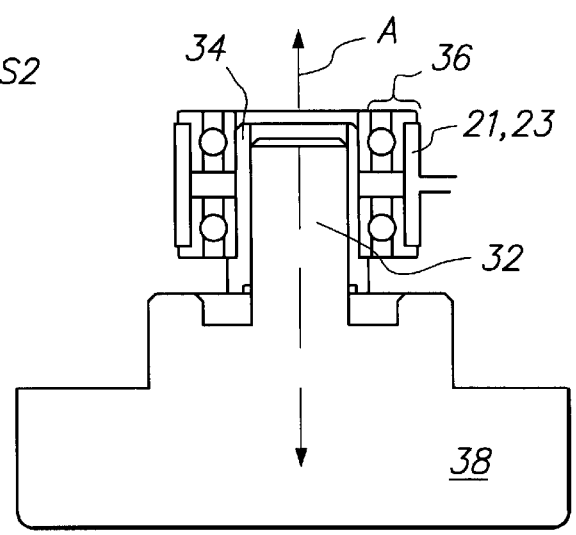
Figure 3C:
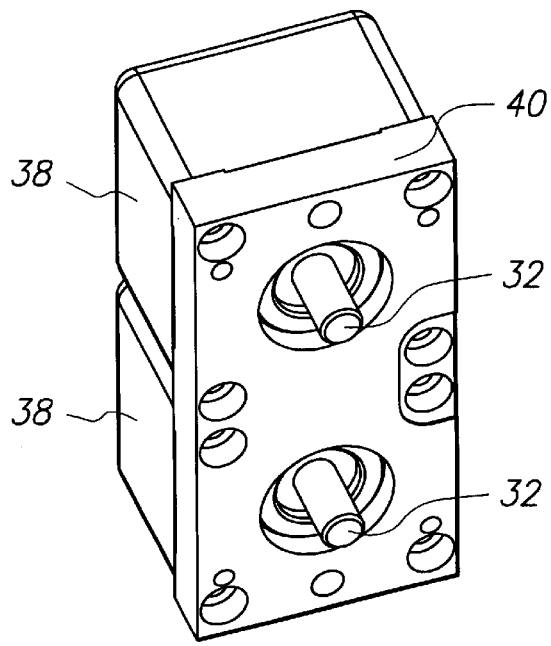

FIGS. 3A–3E are detailed views of the encoded translators 24a, 24b. The encoded translators 24a, 24b, each include a shaft 32, an eccentric 34, a bearing 36 and encoded rotary actuator 38. The shaft 32 is rotated by the encoded rotary actuator 38 about an axis A that is referenced to the frame 28 by attaching the encoded rotary actuator 38 directly to the frame 28, or indirectly to the frame 28 through a mounting block 40 as shown in FIG. 3C.

Figure 3D:
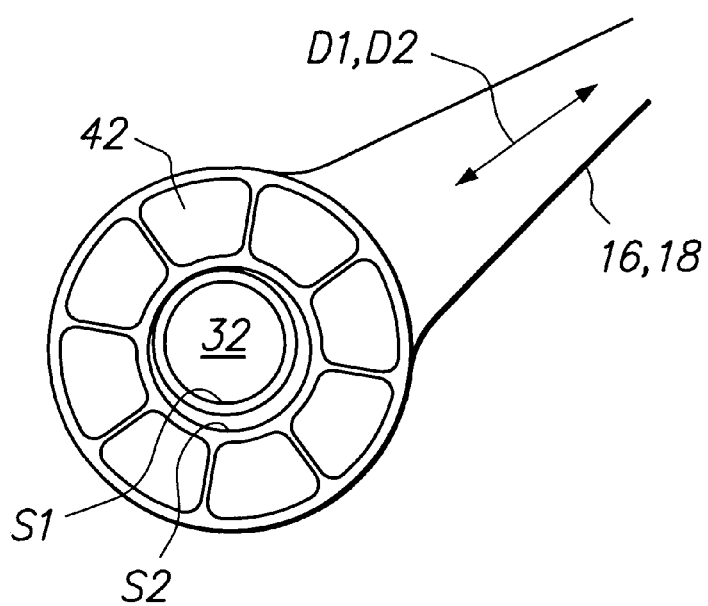

The eccentric 34 shown in FIGS. 3A, 3B and 3D includes an inner sleeve S1 mounted to the shaft 32 and an outer sleeve S2 that is non-concentric with the inner sleeve S1 by an offset, or eccentricity E. The bearing 36 is interposed between the outer sleeve S2 of the eccentric 34 and the ends 17, 19 of the arms 16, 18 that have sockets 21, 23 adapting the ends 17, 19 to receive the encoded translators 24a, 24b. As an alternative to the bearing 36, a rotary flexure 42 is interposed between the outer sleeve S2 of the eccentric 36 and the sockets 21, 23, as shown in FIG. 3D. With the eccentricity E being 0.35 mm and with the encoded rotary actuator 38 having a 340 micro-degree resolution, planar positioning of the optical element 12 with a precision of two nanometers results.

Figure 3E:
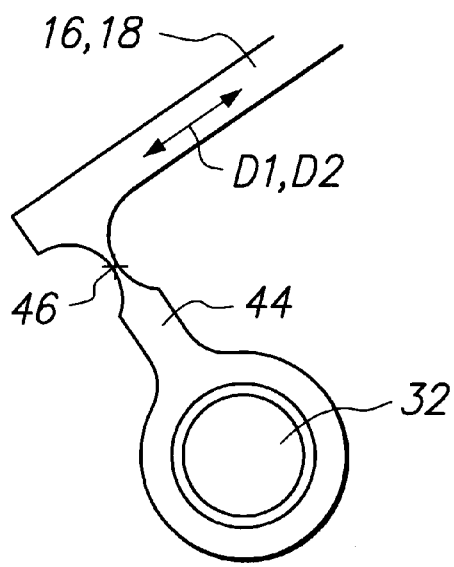

The encoded translators 24a, 24b are alternatively implemented with an extension arm 44 coupled to the shaft 32 of the encoded rotary actuator 38 at one end and having a one-axis rotary flexure 46 at the other end coupled to the arms 16, 18, as shown in FIG. 3E. Alternatively, the encoded translators 24a, 24b are linear or planar actuators referenced to the frame 28 and articulating the arms 16, 18 along the drive axes D1, D2.

The moveable stage 14, the arm 16, the arm 18, the one-axis rotary flexures 20, 22, the rigid non-flexure 45, and the two-dimensional flexure 30 of the precision positioners 10, 50 shown in FIG. 1 and FIG. 2, are formed continuously for ease of fabrication. In this example, the moveable stage 14, the arm 16, the arm 18, the one-axis rotary flexures 20,22, the rigid non-flexure 45, and the two-dimensional flexure 30 are machined or cast from aluminum. Other fabrication techniques or materials suitable for forming the moveable stage 14, the arm 16, the arm 18, the one-axis rotary flexures 20, 22, the rigid non-flexure 45, and the two-dimensional flexure 30 of the precision positioners 10, 50 are alternatively used.

The one-axis rotary flexure 20 is a flexible hinge that pivots about a pivot axis PA1 and the one-axis rotary flexure 22 is a flexible hinge that pivots about a pivot axis PA2. In this example, the one-axis rotary flexures 20, 22 are conveniently implemented as necks formed in the arms 16, 18 of the precision positioners 10, 50 that are sufficiently narrow to elastically flex about the pivot axes PA1, PA2 when actuated by the encoded translators 24a, 24b. The one-axis rotary flexures 20,22 are alternatively implemented using pin bearings, webbed metal structures, metal strips or other elastically flexing hinges. The pivot axes PA1, PA2 of the one-axis rotary flexures 20, 22 are oriented so that each of the pivot axes PA1, PA2 has a component that is perpendicular to the plane P. In this example, the pivot axis PA1 and the pivot axis PA2 are perpendicular to the plane P.

While the preferred embodiments of the present invention have been illustrated in detail, it should be apparent that modifications and adaptations to these embodiments may occur to one skilled in the art without departing from the scope of the present invention as set forth in the following claims.

What is claimed:

1. A positioner for articulation of an optical element within a plane, comprising:
    a frame;
    a moveable stage, coupled to the optical element;
    a first arm, having at a first end a first coupling to the stage, and having a second end adapted to receive a first encoded translator referenced to the frame, the first encoded translator articulating the first arm with a first drive component parallel to the plane; and
    a second arm, having at a first end a second coupling to the stage, and having a second end adapted to receive a second encoded translator referenced to the frame, the second encoded translator articulating the second arm with a second drive component parallel to the plane, wherein at least one of the first coupling and the second coupling to the stage is a one-axis rotary flexure having a pivot axis with an axial component perpendicular to the plane.

2. The positioner of claim 1 wherein one of the first coupling and the second coupling to the stage is a rigid non-flexure.

3. The positioner of claim 1 further comprising a two-dimensional flexure interposed between the stage and the frame, confining motion of the stage to be parallel to the plane.

4. The positioner of claim 2 further comprising a two-dimensional flexure interposed between the stage and the frame, confining motion of the stage to be parallel to the plane.

5. The positioner of claim 1 wherein at least one of the first encoded translator and the second encoded translator include each of a rotating shaft actuated by a encoded rotary actuator and having an axis of rotation referenced to the frame, an eccentric mounted to the shaft, and one of a bearing and a rotary flexure interposed between the eccentric and the at least one of the second end of the first arm and the second end of the second arm.

6. The positioner of claim 2 wherein at least one of the first encoded translator and the second encoded translator include each of a rotating shaft actuated by a encoded rotary actuator and having an axis of rotation referenced to the frame, an eccentric mounted to the shaft, and one of a bearing and a rotary flexure interposed between the eccentric and the at least one of the second end of the first arm and the second end of the second arm.

7. The positioner of claim 5 wherein the axis of rotation has an axial component that is perpendicular to at least one of the first drive component and the second drive component.

8. The positioner of claim 6 wherein the axis of rotation has an axial component that is perpendicular to at least one of the first drive component and the second drive component.

9. The positioner of claim 3 wherein the frame, the moveable stage, the first arm, the second arm, the first coupling, the second coupling, and the two-dimensional flexure are continuous.

10. The positioner of claim 4 wherein the frame, the moveable stage, the first arm, the second arm, the first coupling, the second coupling, and the two-dimensional flexure are continuous.

11. The positioner of claim 5 wherein referencing the shaft to the frame is established by mounting the encoded rotary actuator to the frame.

12. The positioner of claim 6 wherein referencing the shaft to the frame is established by mounting the encoded rotary actuator to the frame.

13. The positioner of claim 1 wherein the first arm has a first drive axis, the second arm has a second drive axis and the optical element is coupled to the stage at an intersection of the first drive axis and the second drive axis.

14. The positioner of claim 5 wherein the first arm has a first drive axis, the second arm has a second drive axis and the optical element is coupled to the stage at an intersection of the first drive axis and the second drive axis.

* * * * *